April 12, 1932.    A. SCHWARZ    1,853,232

LANDING GEAR FOR AIRCRAFT

Filed March 1, 1930    4 Sheets-Sheet 1

Low Position

High Position

INVENTOR
Alfred Schwarz,
BY
ATTORNEY

April 12, 1932.  A. SCHWARZ  1,853,232
LANDING GEAR FOR AIRCRAFT
Filed March 1, 1930   4 Sheets-Sheet 2

INVENTOR
Alfred Schwarz,
BY
ATTORNEY

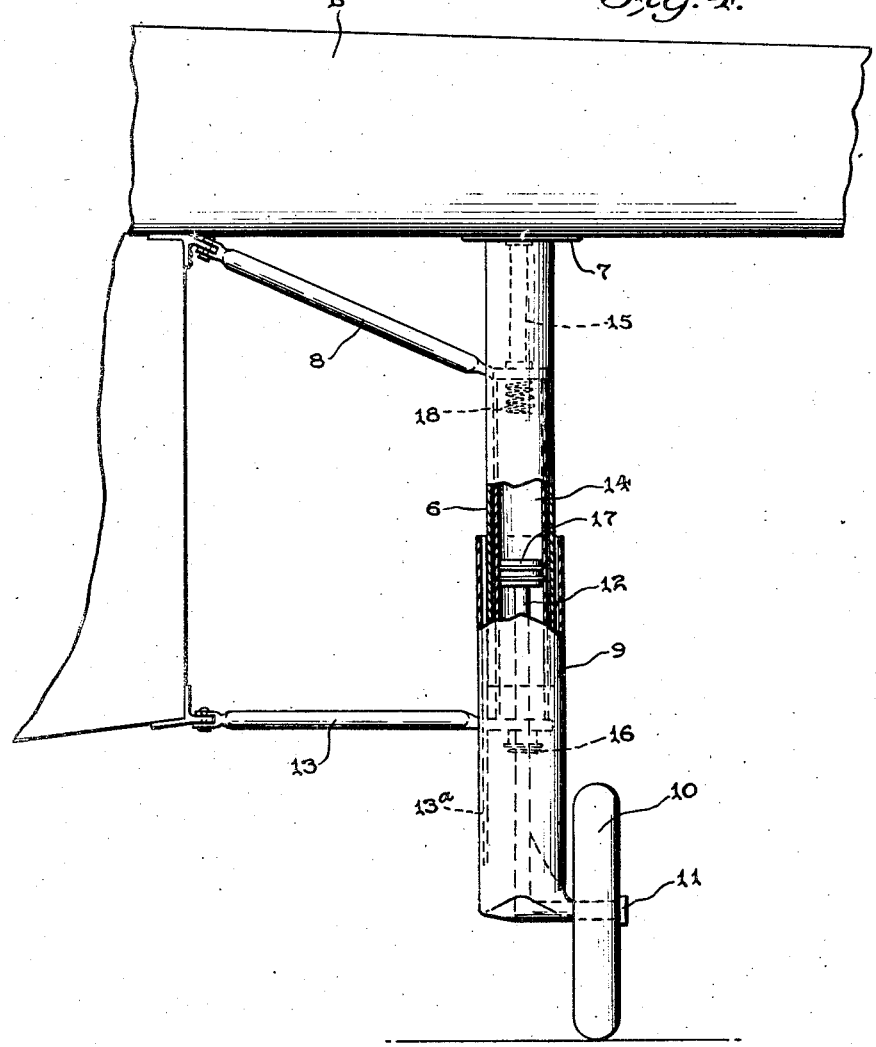

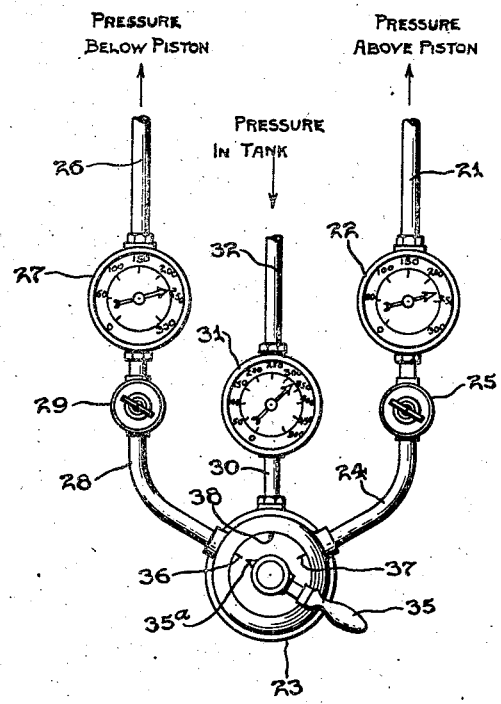

Patented Apr. 12, 1932

1,853,232

UNITED STATES PATENT OFFICE

ALFRED SCHWARZ, OF UPPER MONTCLAIR, NEW JERSEY, ASSIGNOR TO WING AERONAUTICAL CORPORATION, OF NEW YORK, N. Y., A CORPORATION OF DELAWARE

LANDING GEAR FOR AIRCRAFT

Application filed March 1, 1930. Serial No. 432,479.

This invention relates to new and useful improvements in landing gear for aircraft.

In taking off and landing aircraft, particularly those heavier than air, it is desirable for the pilot to be able to adjust his landing gear to the existing conditions. For example, in taking off it often is desirable on account of the weather conditions and wind direction to vary the angle or inclination of the wing surface. In landing it is desirable to have the tail support or skid and the wheels touch the ground at the same time and to be able to relieve any shock that might result from irregular landing conditions. Many other emergencies also may exist which necessitate the pilot having better control of his landing gear.

It therefore is the primary object of this invention to provide landing gear which may be controlled or adjusted by the pilot to enable the craft under his control to be more safely and skilfully handled while landing or taking off, said variations in the landing gear being desirable to compensate for variations in wind direction, speed in landing, and ground conditions.

A further object of the invention is to provide an aircraft landing gear with means under the control of the pilot which will enable the angle or inclination of the wing surface to be varied with respect to the landing surface.

Another object of the invention is to provide landing gear having means which will absorb shocks resulting from irregularities in landing surfaces or fields.

Still another object of the invention is to provide landing gear for aircraft with means which will better adapt the gear to absorb landing shocks and which will enable the inclination or angle of the wing surface to be varied with respect to the landing surface.

A still further object of the invention is to provide pilot controlled fluid pressure means for accomplishing the above noted objects.

Figure 1:
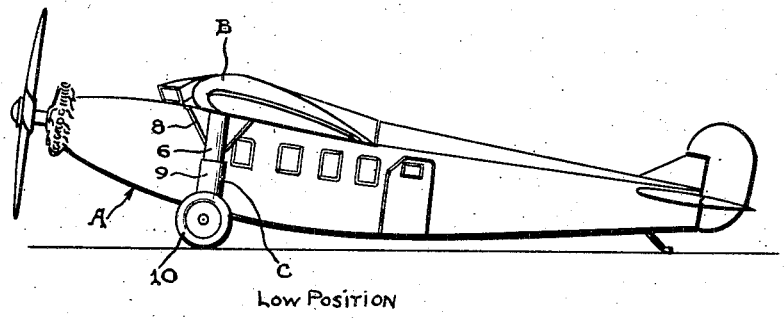
Figure 2:
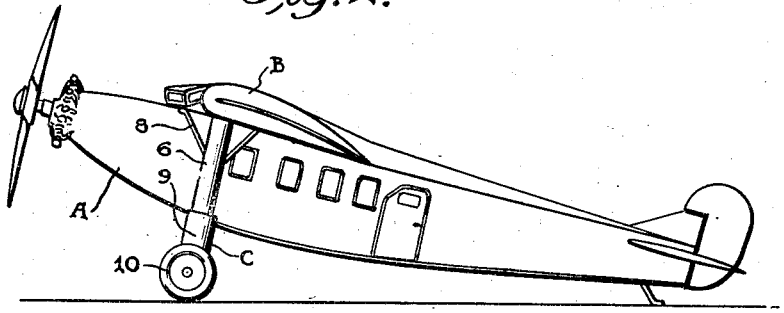
Figure 3:
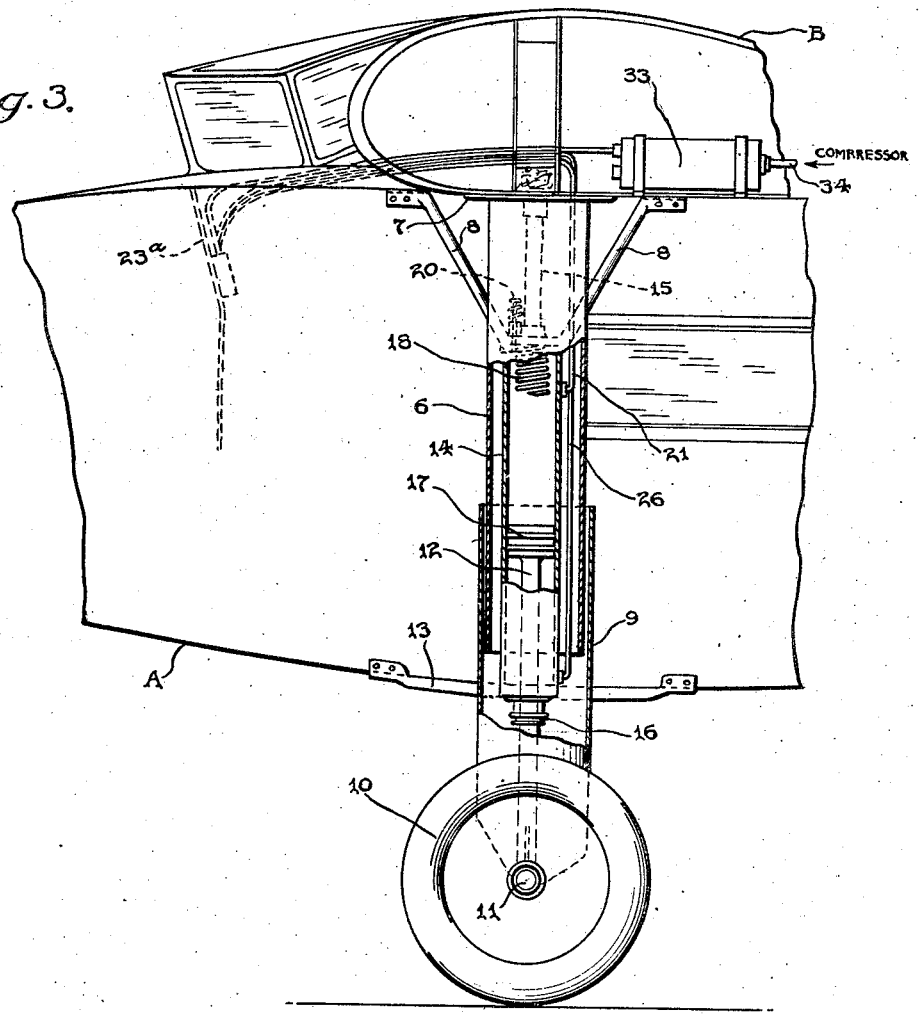

Other objects and advantages of the invention will be apparent during the course of the following description:

In the accompanying drawings forming a part of this specification and in which like numerals are employed to designate like parts throughout the same, Figure 1 is a side elevational view of an aircraft equipped with the landing gear embodying this invention, the said gear being adjusted to provide one possible launching or landing condition, Figure 2 is a similar view to Figure 1 but illustrates the landing gear in a different adjusted condition, Figure 3 is a detail view, partly in elevation and partly in vertical section of an improved form of landing gear embodying this invention, Figure 4 is a detail elevational view, partly broken away, of the landing gear illustrated in Figure 3, and Figure 5 is a detail elevational view of the control apparatus for the landing gear of an aircraft equipped with this invention.

In the drawings, wherein for the purpose of illustration is shown a preferred embodiment of this invention, the character A designates the fuselage of an airship which is equipped with suitable wing structure B and landing gear C.

This invention deals specifically with the landing gear which, solely for the purpose of illustration, has been disclosed as being of the land type. It is to be understood, however, that I do not desire to limit myself to landing gear of this particular type for the principal features of construction can be embodied in gear employing pontoons, or the like. The landing gear also can be associated with the tail of an aircraft as well as the nose or forward portion.

The landing gear C includes a two-part tubular casing including the part 6 suitably secured to the airship, as by means of a flange 7 at its upper end and angle braces 8. In the present embodiment, the upper end of the tubular part 6 is directly secured to the under surface of a wing B by means of the flange 7 and to the fuselage A by means of the braces 8. The lower end of the tubular part 6 is telescopically received in a second tubular part 9. A wheel, or the like, 10 is mounted on a stub axle 11 which may be formed as the lower end of a rod 12. The tubular part 9 may be connected to the airship by any suitable means and is illustrated as being braced with respect to the fuselage A by angularly arranged rods 13 which extend through a slot 13a formed longitudinally in the part 9. These rods 13 are connected at their outer ends to the lower end of a cylinder 14 about to be described.

Positioned within the casing or housing formed by the telescopically associated tubular parts 6 and 9 is a cylinder 14 which is connected to the wing structure by a standard or brace 15. The lower end of this cylinder 14 is provided with a suitable gland or packing structure 16 through which the rod 12 slidably extends. This rod has suitably connected to its upper or inner end a piston 17 arranged within the cylinder 14. This piston is suitably packed, as by means of piston rings so that a snug, sliding fit is provided between the cylinder 14 and the piston 17.

A shock absorbing spring 18 is positioned within the upper end of the cylinder 14 and will function to check or stop the upward movement of the piston within the cylinder should the fluid system, about to be described, fail in an emergency. An automatic relief valve 19 is provided at the upper end of the cylinder 14 and includes a setting or adjustment control knob 20 within the reach of the pilot seat whereby the pressure within the cylinder above the piston may be controlled as desired.

The upper end portion of the cylinder 14 is connected to a pipe 21 which leads to a pressure gauge 22 mounted on the instrument board 23a of the airship. This pressure gauge is connected to a master control valve 23 by a pipe 24 which has interposed therein a control valve 25. The lower end of the cylinder 14 is connected to a pipe 26 which extends to a pressure gauge 27. This gauge is connected by a pipe 28, having a control valve 29 interposed therein, to the master control valve 23. This master control also is connected to a pipe 30 which leads to a pressure gauge 31 connected by a pipe 32 to a storage tank 33. A line 34 leads from this tank to a suitable compressor, not shown. The master control valve 23 is provided with an operating handle 35 by means of which the pilot may control the landing gear for varying the angle or inclination of the wing surface in accordance with varying conditions.

The landing gear for only one side of an airship has been illustrated in detail but it is to be understood that the landing gear on both sides of the airship are to embody the present invention. The control apparatus disclosed in Fig. 5 may be duplicated for the landing gear on each side of the ship or the control may be connected to the landing gear on both sides for simultaneously controlling the same.

When the landing gear is adjusted to alter the angle of take off, air is admitted by the pilot, through manipulation of the handle 35 of the master control valve 23 either under or over the piston 17 as the case may be to raise or lower the ship. Fig. 5 discloses the handle in a position to deliver fluid from the storage tank 33 to the pipe 26 which extends to the lower portion of the cylinder, that is to the cylinder below the piston 17. When in this position, the pointer 35a of the control handle 35 points at the graduation 36. When the pilot desires to connect the storage tank 33 with the pipe 21 which leads to the upper end portion of the cylinder, the valve handle 35 is manipulated to move the pointer 35a into alignment with the graduation 37. When the pointer 35a registers with the graduation 38, the storage tank 33 is disconnected from both ends of the cylinder.

The relief valve 20 may be adjusted and left in a desired predetermined normal condition for ordinary landings but in the event of a forced landing where the plane threatens to strike the ground at a greater speed than usual, the pilot may adjust the control knob 20 for setting the relief valve to a higher pressure.

While I prefer to use compressed air in the present construction, it is of course to be understood that I may use any desired fluid, such as oil, water, or the like.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. Landing gear for an airship including casing means connected to the body of the airship, a piston and cylinder structure within the casing means, a contacting element connected to one portion of said structure, means for varying the normal position of the piston with respect to the length of the cylinder, and a shock absorbing spring in one end of the cylinder.

2. In combination with an airship, a fixed upper tubular casing secured to the airship, a lower tubular casing telescoping and vertically movable with respect to said upper casing, a longitudinal slot in said lower casing, a cylinder within said casings, a rod disposed in said slot and secured to the airship and to said cylinder, a piston within said cylinder, a piston rod for said piston having a projection within said lower casing, a contacting element carried by said projection and lower casing, and means for admitting fluid to said cylinder above and below the piston.

In testimony whereof, I affix my signature.

ALFRED SCHWARZ.